United States Patent [19]
Spear et al.

[11] Patent Number: 6,003,115
[45] Date of Patent: Dec. 14, 1999

[54] METHOD AND APPARATUS FOR PREDICTIVE LOADING OF A CACHE

[75] Inventors: Daniel S. Spear, Beverly Hills; Damon L. Cusato, Pacific Palisades, both of Calif.

[73] Assignee: Quarterdeck Corporation, Marina Del Rey, Calif.

[21] Appl. No.: 08/902,441

[22] Filed: Jul. 29, 1997

[51] Int. Cl.⁶ .................................................. G06F 12/12
[52] U.S. Cl. ........................... 711/137; 711/113; 711/118; 711/204; 711/213
[58] Field of Search ........................... 711/111, 112, 113, 711/133, 137, 158, 169, 204

[56] References Cited

U.S. PATENT DOCUMENTS

| | | | |
|---|---|---|---|
| 5,055,394 | 10/1991 | Whisler | 707/200 |
| 5,371,865 | 12/1994 | Aikawa et al. | 711/125 |
| 5,390,318 | 2/1995 | Ramakrishnan et al. | 711/158 |
| 5,420,998 | 5/1995 | Horning | 711/113 |
| 5,537,573 | 7/1996 | Ware et al. | 711/137 |
| 5,600,817 | 2/1997 | Macon, Jr. et al. | 711/137 |
| 5,778,436 | 7/1998 | Kedem et al. | 711/137 |
| 5,809,560 | 9/1998 | Schneider | 711/204 |
| 5,835,957 | 11/1998 | Lin | 711/169 |
| 5,875,464 | 2/1999 | Kirk | 711/129 |

*Primary Examiner*—Eddie P. Chan
*Assistant Examiner*—Than V. Nguyen
*Attorney, Agent, or Firm*—Hecker & Harriman

[57] ABSTRACT

An improved method for loading a cache is described. The present invention monitors memory access to identify specific types of memory access, for example, requests to launch executable program code stored in a hard disk drive. The method maps the stored program code into a plurality of memory blocks. The memory block access during the launching of the executable program code is then profiled. When the computer remains idle for a predetermined time the profiling process is stopped. Alternatively, if the computer does not remain idle, for the predetermined time, the profiling process is stopped after a timeout period. The profile is then evaluated to identify the most frequently accessed memory blocks. A list of the most frequently accessed memory blocks is stored. The number of memory blocks stored in the list depends upon the size of the cache. The file access system is monitored to identify the next time that a profiled memory access process is initiated. When a profiled process is initiated, the list of the most frequently accessed memory blocks for that process is retrieved. These memory blocks are then pre-loaded into the software disk cache. Pre-loading the memory blocks into the disk cache avoids the long access times required to load pages from persistent storage devices, and thus significantly increases the execution speed of the application program. The present invention predictive cache system can reduce the time required to load executable programs from a hard disk by 40%.

29 Claims, 3 Drawing Sheets

| MEMORY BLOCK | NUMBER OF MEMORY BLOCK ACCESSES |
|---|---|
| 1 | 3 |
| 2 | 7 |
| 3 | 0 |
| 4 | 8 |
| 5 | 2 |
| 6 | 5 |
| 7 | 1 |
| 8 | 6 |
| 9 | 4 |
| 10 | 8 |

| MEMORY BLOCK | NUMBER OF MEMORY BLOCK ACCESSES |
|---|---|
| 1 | 3 |
| 2 | 7 |
| 3 | 0 |
| 4 | 8 |
| 5 | 2 |
| 6 | 5 |
| 7 | 1 |
| 8 | 6 |
| 9 | 4 |
| 10 | 8 |

FIG. 3

METHOD AND APPARATUS FOR PREDICTIVE LOADING OF A CACHE

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file records, but otherwise reserves all copyright rights whatsoever.

BACKGROUND OF THE INVENTION

1. Field of the Invention

This invention relates to the field of computer system information retrieval systems, and more specifically to computer system cache memories.

2. Background Art

Loading information into a computer processor memory from a persistent storage device, such as a hard drive, introduces significant delays into computer system operation. Persistent storage caches typically contain information most recently loaded from a persistent storage device. These caches often do not contain requested information thereby requiring the information to be retrieved from a persistent storage device and delaying system operation. The following background information is presented to provide a better understanding of this problem.

A typical computer system consists of a number of modules or components. Computer systems typically include a central processing unit (CPU) such as a microprocessor. The microprocessor is a program-controlled device that obtains, decodes and executes instructions. A computer system also includes storage components for storing system operating software, application program instructions and data. These storage components may be read only memory (ROM), random access memory (RAM), disk or tape storage, or any other suitable storage means.

A computer system typically also includes input/output (I/O) components for connecting external devices to the microprocessor. Special purpose components, such as memory management units or co-processors, may also be part of the computer system.

Computers are used to process data. To allow processing of data, input data must be stored until it is to be used by the central processing unit (CPU). Also, output data must be stored after it has been processed. During some processing operations, the CPU may also require the storage of data temporarily while instructions are executed on that data. In addition, the application program that controls the processing and the operating system under which the program runs must be accessible to the CPU. This information is made available to the CPU by storing it either in a resource known as "main memory," or in a "cache" memory.

The memory component known as main memory is dynamically allocated to users, data, programs or processes. Main memory is typically a silicon-based memory such as a RAM. In many applications, dynamic random access memory (DRAM) is used as the main memory. The operating speed of CPU's often exceeds the speed at which DRAM can be accessed. For example, a CPU may operate at 100 MHz, with therefore a 10 ns cycle period. By contrast the DRAM main memory may have a standard access time of 60 ns. To improve the system operating speed small high speed secondary memory is used called cache memory.

Cache memory is typically Static Random Access Memory (SRAM) with a typical access time of 15–25 ns. Because SRAM devices typically require larger device packages and are considerably more expensive than DRAM devices, cache memory is typically between ten and a thousand times smaller than the main memory. Cache memory combines the advantages of fast SRAMs with the low cost of DRAMs to maximize the efficiency of the memory system. Cache memory that is incorporated into the microprocessor chip is called a primary cache. A secondary cache is a cache memory that supports the main memory and is located outside of the microprocessor chip.

Where information is stored in a computer system generally depends on the amount of information to be stored, the importance of rapid access to the information, and the amount of time that the information is to be stored. The different storage resources in a computer system are each optimized to serve different storage functions. As discussed above, with regard to the access speed of the different memory resources, cache memory provides the fastest information access, followed by DRAM main memory, then a hard disk, and finally a floppy disk or an optical disk such as a CD ROM. With regard to storage capacity, hard disk drives generally provide the largest storage capacity. For example, a personal computer system may have a two gigabyte ("Gbyte") hard drive, a 1.4 megabyte ("Mbyte") floppy disk, a 32 Mbyte main memory RAM, a 16 kilobyte ("Kbyte") primary cache, and a 256 Kbyte secondary cache. An application program such as a word processor, may initially be stored on a hard disk. When the word processor program is executed the primary functional blocks of the program may be loaded into main memory so that the CPU can execute the primary functions of the program rapidly without having to access the hard disk.

A small subset of the program instructions stored in main memory are also stored in the cache memory to maximize the program operating speed. When the CPU reads code, it sends out the corresponding memory address. A cache controller is located between the CPU and main memory. The cache controller determines whether the requested code is available in the cache. When the requested code is found in the cache it is called a cache hit. When the requested code is not found in the cache it is called a cache miss. When the requested code is stored in the cache, the cache controller reads the code from the cache and passes it on to the CPU. The read access is intercepted by the cache and the main memory is not accessed.

When a cache miss occurs, the code is obtained from main memory. This slows down the operation of the program because of the slower access speed of main memory. Typically when a cache miss occurs, in addition to the requested bytes, the entire cache line which includes the requested bytes is read from the main memory into the cache. This is called a cache line fill. Cache lines are typically 16 or 32 bytes in size. One approach to loading code into the cache is to replace the cache line that has not been accessed for the longest time. Another approach to loading the cache is to randomly select the cache line to be replaced.

When an application program is loaded it is transferred from persistent storage, such as a hard drive, to main memory. Microprocessors with the Windows® 95 operating system use 32-bit physical addresses to address physical memory. Memory addresses that application programs use are called "virtual" addresses. Virtual addresses are translated to physical addresses through a "page table."

Memory shortages can occur if more memory is needed than the physical memory available. A paging system is used to, in effect, extend the amount of physical memory available on a system. A paging system can be used to free allocated memory thereby making it available for use by another memory requester. The contents of allocated memory is typically written to a storage medium (e.g., a hard disk drive). This process is referred to as "swapping out" the contents of memory. Once the contents of allocated memory are "swapped out" the memory can be freed for allocation to another. Contents that were "swapped out" can be reloaded into memory from storage as it is needed.

Each page of memory includes control bits. One bit indicates whether a particular page has been accessed; another if the page has been written to; a third bit indicates whether the page has been swapped out to disk and must be reloaded into memory. The operating system uses the control bits to determine whether a page can be swapped to a disk file to obtain more free physical memory. Windows® 95 uses a least-recently-used (LRU) algorithm to determine what pages to swap out to disk.

In the Windows® 95 operating system, application programs get loaded into memory in 4 Kbyte pages. The use of relatively small independent pages provides the multi-tasking advantages described above; however, the page system typically reduces the efficiency of the memory loading process. The pages are generally loaded in an essentially arbitrary order. Therefore, the pages are not read from disk in the most optimal way. Furthermore, the process of loading files from a hard disk is slow compared to accessing files stored in main memory. One primary factor that contributes to the relatively slow information retrieval speed for a hard disk is the time required to physically move the head relative to the disk to read the requested information. This disk seeking time is compounded for files that are comprised of sections stored at different locations on the disk. This is often the case because as a hard disk begins to fill up with files, the size of the free contiguous disk sections decrease. A new large file may therefore be stored in numerous small fragments. As files are repeatedly written to and deleted from the disk, the remaining free space on the disk becomes highly fragmented. Highly fragmented files combined with the already slow hard disk information retrieval speed can create significant delays in computer system operation.

A major problem that significantly reduces performance is that memory pages or disk sectors are loaded from the hard disk in the order in which they are executed, not the order in which they are stored on the hard disk. Thus, even if adequate contiguous storage is available on the hard disk and files are stored in consecutive order in a contiguous area of the hard disk, the files may be accessed in a different order, thereby requiring the read head of the hard disk to perform many seeks to read the data stored on the hard disk. Each seek typically requires the head to be moved to the track or cylinder in which the desired sector is located, to be precisely positioned over the track or cylinder, to locate the desired sector within the track or cylinder, to wait for the desired sector to pass by the read head, and to read the data stored in the desired sector. Thus, the loading of memory pages or disk sectors from the hard disk in an order different from the order in which they were stored significantly reduces system performance.

To reduce the delays caused by slow hard disk information retrieval speeds many operating systems include a software disk cache. The software disk cache is a section of main memory that is allocated to store information retrieved from the hard disk. The relationship between the software disk cache and the hard disk is conceptually similar to the relationship between the main memory and the secondary cache. In a personal computer system the software disk cache typically ranges in size from 512 Kbytes to 16 Mbytes. Generally the software disk cache stores the information most recently loaded from the hard disk. Some prior art cache loading systems load the software disk cache with information from the hard disk following a simple sequential access pattern. For operating systems that do not provide a software disk cache, programs, such as SmartDrive, can be purchased to add this feature. SmartDrive essentially stores executable code after a program has been launched. Smart-Drive does not anticipate what code will be required by a program before the program is launched.

The prior art disk cache loading systems that load the software disk cache with information from the hard disk using a simple sequential access pattern are generally ineffective with files accessed in a non-contiguous manner because the software disk cache does not contain the non-contiguous segments when they are requested. Prior art software disk cache systems that merely retain the most recently loaded information from the hard disk often fail to contain a requested memory page the first time the page is requested. As a result significant delays due to slow hard disk information retrieval speeds persist in prior art software disk cache systems. Thus, an improved method of loading a software disk cache is needed to increase the software disk cache hit rate and, therefore, to reduce system delays due to slow hard disk information retrieval speeds.

SUMMARY OF THE INVENTION

The present invention provides a predictive cache system. The present invention monitors memory access to identify specific types of memory access, for example, requests to launch executable program code stored in a hard disk drive. The method maps the stored program code into a plurality of memory blocks. The memory block access during the launching of the executable program code is then profiled. When the computer remains idle for a predetermined time the profiling process is stopped. Alternatively, if the computer does not remain idle, for the predetermined time, the profiling process is stopped after a timeout period. The profile is then evaluated to identify the most frequently accessed memory blocks. A list of the most frequently accessed memory blocks is stored. The number of memory blocks stored in the list depends upon the size of the cache.

The file access system is monitored to identify the next time that a profiled memory access process is initiated. When a profiled process is initiated, the list of the most frequently accessed memory blocks for that process is retrieved. These memory blocks are then pre-loaded into the software disk cache. Pre-loading the memory blocks into the disk cache avoids the longer access times required to load discontiguous pages from persistent storage devices, and thus significantly increases the execution speed of the application program. The present invention predictive cache system can reduce the time required to load executable programs from a hard disk by 40%.

BRIEF DESCRIPTION OF THE DRAWINGS

FIG. 3 illustrates one embodiment of a memory block access profile table for the first ten memory blocks of a file.

DETAILED DESCRIPTION OF THE INVENTION

The present invention is directed to a predictive cache system. In the following description, numerous specific details are set forth to provide a more thorough understanding of the present invention. It will be apparent, however, to one skilled in the art, that the present invention may be practiced without these specific details. In other instances, well-known features have not been described in detail so as not to unnecessarily obscure the present invention.

Figure 1:
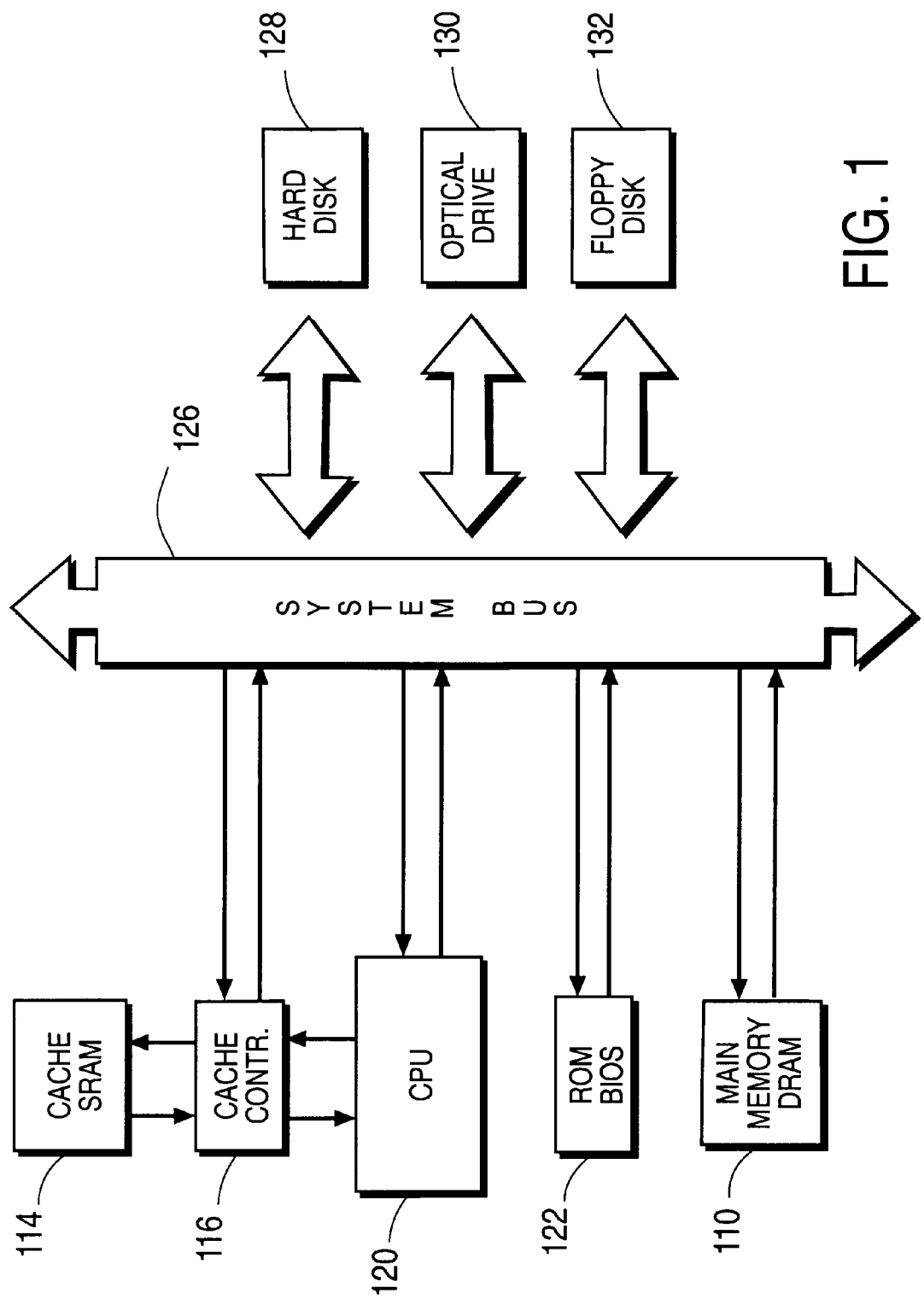
FIG. 1 illustrates a block diagram of a computer system.

FIG. 1 illustrates a computer system in which the present invention can be applied. System bus 126 is coupled to CPU 120, to ROM BIOS 122, to main memory DRAM 110, to cache controller 116, and to persistent storage devices, including hard disk 128, optical drive 130 and floppy disk 132. Information retrieved from hard disk 128 is typically transferred through system bus 126 to main memory 110. Cache controller 116 is coupled to CPU 120 and to SRAM cache memory 114. A section of main memory 110 can be allocated to create a software disk cache, as discussed above.

The present invention is generally applicable to operating systems that load memory in block increments. For simplicity of description, the present invention will be described as applied to the Windows® 95 operating system. Similarly, many applications are described in regard to a hard disk drive. These applications are provided by way of example, it being understood that the present invention has broad application to other types of persistent storage devices. Application programs are typically stored on a hard disk drive. To execute an application program in a graphical operating system, such as Windows®, a user can double click on an icon representing the application. As each instruction of the program is executed the corresponding page is loaded into main memory as needed.

Typically, only certain memory pages of applications programs are loaded into many memory at one time. Therefore, a main executable program is loaded into memory and other modules of the program are loaded from a hard disk, or other persistent storage device, upon demand. For example, in word processing programs the primary text editor may be loaded into main memory, but when a user wants to change text fonts a font module may have to be loaded from the hard disk. As the application program is executing it calls modules to perform specific tasks. Referring to FIG. 1, the paging system in CPU 120 sends out the corresponding memory address for the module. If the page is in main memory 110, it is retrieved by CPU 120. If the page is not in main memory 110, then the page is retrieved from persistent storage, such as hard disk 128. This process continues until the main executable program has launched the module.

As described above, files are. often stored in segments located in different sections of the hard disk. As a result, the hard drive may be required to skip around the disk a great deal to locate small blocks of code, which is inefficient because of the significant seek time required to move the disk heads around the disk. The more discrete areas of the disk that the disk head must read from the longer the required retrieval time to transfer the requested information to main memory, and the greater the program operating speed improvement that can be provided by the present invention predictive cache system.

OVERVIEW

Figure 2:
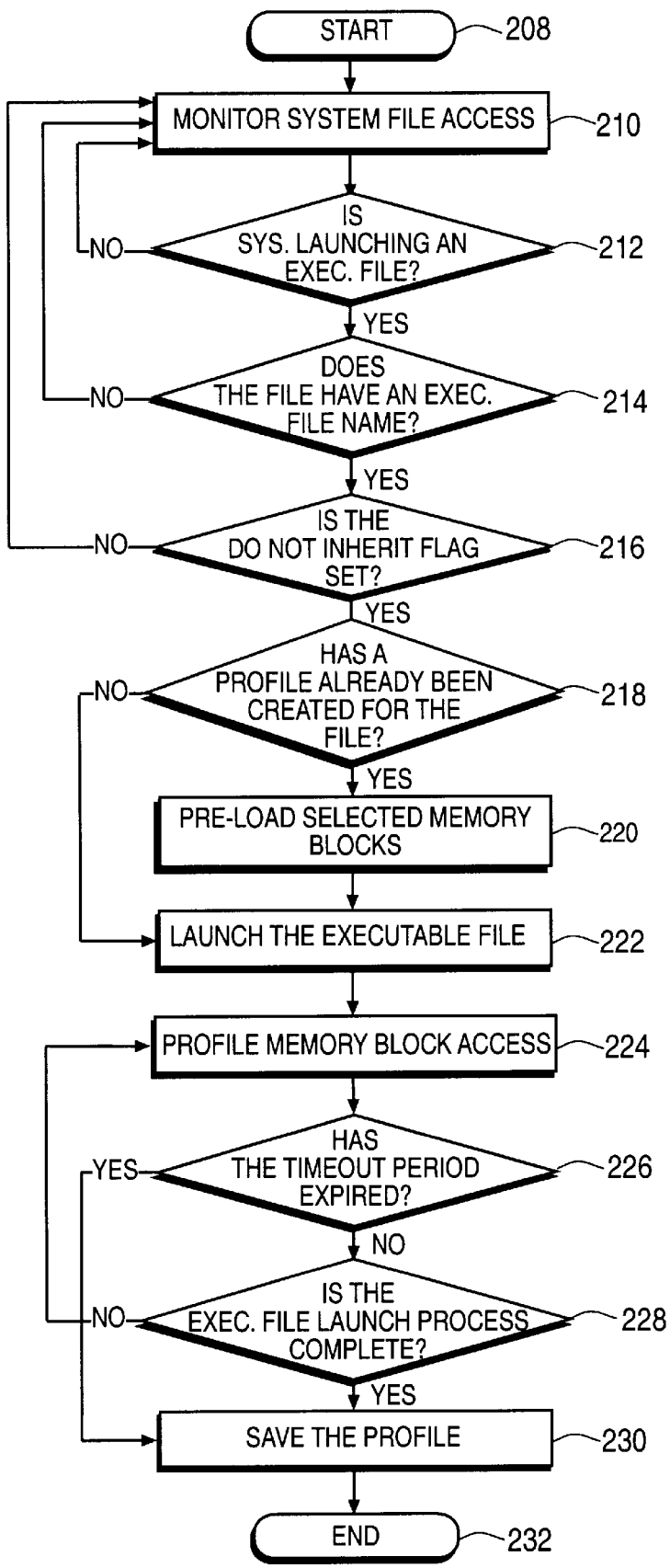
FIG. 2 illustrates a flow diagram of a predictive cache method of one embodiment of the present invention.

FIG. 2 illustrates a flow diagram of a predictive cache method of one embodiment of the present invention. The following provides a brief overview of this method. Specific features of the invention are described in greater detail in subsequent sections. At step 210, the method monitors the CPU file access requests. Generally files can be accessed for many purposes, including execution, deletion, or duplication. At step 212, the system determines whether the file access is to launch an executable file. If not then the method returns to step 210 to continue to monitor the system's file access. If the file access is to launch an executable file then at step 214, the method confirms that the file name is an executable file name. If the file name is not an executable file name then this indicates that the preliminary determination of step 212 was inaccurate and the method returns to step 210 to monitor the system's file access. If the file name is an executable file name then at step 216 the method checks whether the do not inherit flag is set. If the do not inherit flag is not set then the method returns to step 210. If the do not inherit flag is set then the method continues at step 218.

At step 218, the system determines whether a memory block access profile has already been created for the file. If a memory block access profile has been generated for the file then at step 220 the memory blocks accessed the most, as indicated by the stored profile, are pre-loaded into the software disk cache. This allows these heavily accessed memory blocks to be retrieved by the CPU from the software disk cache in main memory rather than from persistent storage. Having read these memory blocks from disk sequentially, rather than in a random order, provides substantial time savings in the program loading process. At step 222, the system launches the executable file. If a memory block access profile has not been generated for the file then after step 218, the method proceeds directly to step 222.

At step 224, the system profiles the memory block access. At step 226, the system determines whether the timeout period has expired. If the timeout period has expired then at step 230 the system saves the memory block access profile. If the time period has not expired, then at step 228, the system determines whether the executable file launch process is complete. If the executable file launch process is not complete then the system continues to profile the memory block access in step 224. If the executable file launch process is complete then at step 230 the system saves the memory block access profile. The method is complete at step 232.

IDENTIFYING EXECUTABLE FILE LAUNCH PROCESSES

The following sections provide a more detailed description of the predictive cache system of the present invention. In the embodiment of FIG. 2 the predictive cache method is only triggered when an executable file is launched. In other embodiments, the predictive cache system is applied to run time execution of program modules and to large data file retrieval. In an embodiment designed for the Windows® 95 operating system, the method uses a hook in the int 21 chain and another in the IOS manager. As is known by those of ordinary skill in the art, a hook is a programming technique that allows a programmer to add new code to an existing interface. An interface is a method for one program to execute code in another program.

One approach to determining whether a file access is a launching of an executable file is to trap on flags in the file system. One such flag is the do not inherit flag. When the do not inherit flag is set, that indicates that a first program that is launching a second program does not want the second program to be a child process of the first program. In other words, the do not inherit flag indicates that the program launching the requested program does not want to incorporate the requested program into the launching program's file structure. When the do not inherit flag is set it indicates that the file access is likely a launch of an executable file. For example, when an executable file is run by selecting it from the Windows® Explorer file manager program, Windows® Explorer sets the do not inherit flag because Windows®

Explorer does not have any control over the operation of the application. Alternatively, when, for example, an internet browser downloads a new picture file from the internet, the browser launches a viewer to view the picture file. The viewer program is likely to be made a child process of the browser which controls the viewer program. When the user quits the browser, the browser closes the viewer program and the picture file.

PAGE PROFILING

The present invention profiles the number of times the program reads from individual blocks of memory in persistent storage. This profile is called a memory block access profile. The present invention maps the stored executable program code into memory blocks. When an executable program stored on a hard drive is launched it is loaded from the hard drive to main memory. The number of times each memory block is read from during the launching of a program is recorded in a table. In one embodiment, the present invention maps the executable program into 32 Kbyte blocks, wherein each 32 Kbyte block is comprised of eight 4 Kbyte pages. The block size that is defined depends on the operating system that the present invention is applied to. The size of the block, which forms one unit in the profile, is determined based upon the parameters of the file system, including the page size which constitutes the smallest memory block that the file system retrieves from persistent storage.

FIG. 3 illustrates one embodiment of a memory block access profile table for the first ten memory blocks of a file. In an embodiment with 4 Kbyte pages and 32 Kbyte blocks the number of times that each memory block is accessed is likely to be between zero and eight times, as illustrated in FIG. 3. This is because the CPU requests information from the hard disk in 4 Kbyte pages. The first time that an executable program is launched there is no memory block access profile, and thus the software disk cache is not pre-loaded. After a 4 Kbyte page is loaded from the disk into main memory, if it is required again, it will likely be available in main memory. As a result a memory block is likely to be accessed no more than once for each page contained therein. This means a 32 Kbyte memory block comprising eight 4 Kbyte pages is not likely to be accessed more than eight times. In situations where main memory is full and memory pages are frequently swapped between main memory and the hard disk, memory blocks may be accessed more than once per page in the memory block. This is because the pages loaded into main memory may be transferred back to the hard disk, and then subsequently requested. When such transferred pages are requested they must be re-loaded from the hard disk.

One embodiment of the invention tracks memory block access using binary indications. One value of binary indication designates memory blocks that have not been accessed, while another value of binary indication designates memory blocks that have been accessed at least once. By keeping track of which memory blocks have been accessed, those memory blocks may be loaded in advance in the future to reduce the number of seeks required and increase system performance.

In one embodiment the profiling of memory block access is stopped after the application program remains idle for a predetermined time. The idle time period is defined to be of a sufficiently long duration to indicate that the program is awaiting input, and thus has completed the program launch. Some programs may execute for extended periods of time without requesting any user input, for example, a regularly scheduled automatic backup program. To operate properly with such programs a timeout period is also used. The timeout period is the maximum amount of time that the system will profile memory block access. If no idle period has been detected after the system has monitored file access for the timeout period then the system stops profiling.

In one embodiment the timeout period depends on the file size. A base timeout period is defined for files that are no larger than a predetermined size. For files that are larger than the predetermined size the timeout period is extended based on the additional size of the program. For example, for a base file size of 1 Mbyte the timeout period is 5 seconds. For every additional megabyte contained in a given file, the timeout period for that file is extended 2.5 seconds.

The memory block access profile information is then stored in the Windows® Registry, which is essentially a database of program parameters. The next time the program is launched the configuration file is accessed to pre-load the cache with the memory blocks accessed the most during the previous launch of the program. In an operating system that uses a page based memory system, the present invention can provide the increased speed afforded by loading memory blocks larger than a single page from the hard disk, while maintaining the multi-tasking flexibility provided by page based main memory systems. More specifically, a page based memory system avoids the need for large free contiguous blocks of main memory because individual pages can be stored non-contiguously. This minimizes the amount of swapping of information between persistent storage and main memory because the available main memory can be used more efficiently. Minimizing the amount of disk swapping maximizes the operating speed of programs because information can be retrieved substantially faster from main memory than from persistent storage.

Generally, the process of launching the application program follows the same memory access pattern each time it is executed because typically the main executable program code is not significantly changed after a user first configures the program. As a result, pre-loading the cache based on the access pattern of the previous time that the program was loaded generally accurately anticipates what persistent storage memory blocks will be most frequently accessed. Thus, requested code is quickly retrieved from the disk cache, rather than delaying the launch process while the hard drive accesses all of the different sectors on the disk required to retrieve the requested code.

PRE-LOADING MEMORY BLOCKS

When a previously profiled memory access process is initiated, the most frequently accessed memory blocks from that process are pre-loaded into the software disk cache. The memory block access profile identifies the memory blocks that were accessed the most during the memory access process. The number of blocks that are selected to be pre-loaded is determined based on the size of the software disk cache. A computer system with a relatively small main memory 110 may have a small software disk cache, for example, 500 Kbytes. In such a system, 500 Kbytes of the most accessed memory blocks of a 2 Mbyte executable program may be pre-loaded into the software disk cache.

The memory blocks are loaded into the cache a block at a time. In page based memory systems memory is often loaded in one page increments. Loading information in memory blocks, that are larger than the memory page size that would otherwise be loaded from the hard disk, can provide a significant increase in the loading speed. Hence, loading 32 Kbyte blocks in a 4 Kbyte memory page system can significantly reduce delays due to slow hard disk information retrieval speeds.

UPDATING MEMORY BLOCK ACCESS PROFILES

In one embodiment each time an application program is launched a new memory block access profile is generated. Although, as described above, the program launch process is typically the same each time the program is executed, this is not always the case. A user may change the configuration parameters of a program which can modify the persistent storage memory block access during the program launch process. Alternatively, a user may provide an update to the program which also may alter the program launch process. Generating a new profile each time the application program is launched automatically adjusts the cache pre-loading process to changes in the parameters of the executable program.

In another embodiment, cumulative statistical profiles of the memory access profiles are maintained. Storing profiles from a plurality of launches of a program minimizes the effect of any anomalous occurrences in a particular profile. As is well known by those of ordinary skill in the art, a variety of statistical techniques can be used to reduce the effect of anomalous data, including, for example, calculating averages or median values. A further technique to refine the profile is to eliminate from the profile samples, for a given memory block, that deviate more than a predetermined number of standard deviations from the mean value of the samples for that memory block.

OTHER EMBODIMENTS

The present invention predictive cache can be applied generally to increase the speed of memory access for processes that have at least a substantial element of repeatability. As described above one process that generally repeats the same pattern of memory access is the program launching process. In addition to program launch processes, the present invention can be applied to run time program execution. Application programs are often too large to be entirely loaded into main memory. Typically, a main executable program is maintained in main memory, and modules of the program that perform specific functions are loaded from persistent storage as needed. The present invention can be used to profile memory block access during the launching of program modules requested by the main executable program. The present invention can then be applied to increase the loading speed of modules by pre-loading the most frequently accessed memory blocks of module files in persistent storage.

The modular approach to programming is widely used in the Windows® 95 programming context. Windows® 95 uses Dynamic Link Libraries to perform standard functions. Dynamic Link Libraries are generally not directly executable. They are separate files containing functions that can be called by programs and other Dynamic Link Libraries to perform certain jobs. Programmers can create Dynamic Link Libraries to perform functions required for a particular application. The Dynamic Link Library becomes in effect an extension to the Windows® operating system. A component program may comprise a 40 Kbyte main executable file and hundreds of Dynamic Link Libraries. To increase the operating speed of such programs the predictive cache system of the present invention can be used to profile memory block access for Dynamic Link Libraries. These profiles can then be used to pre-load the most frequently accessed memory blocks to expedite the Dynamic Link Library launching process.

The present invention can also be used to profile memory block access patterns during data access processes. Data access profiles can be evaluated to identify processes that exhibit a sufficient level of repeatability to warrant application of predictive cache loading. Sample applications of the present invention predictive cache to data access processes include: frequently accessed detailed graphic images, and large reference data files such as those found in multi-media encyclopedia's, as well as medical, technical, and legal reference software.

EXEMPLARY APPLICATION

To provide an exemplary application, the operation of one embodiment of the present invention predictive cache is described in conjunction with the execution of a drawing program, such as, for example, Corel® Draw, in a Windows® 95 environment. To launch the drawing program a user double clicks on a shortcut icon for the drawing program. The shell then requests the executable file. The predictive cache system is triggered by the shell's executable file request. The predictive cache system verifies that the requested file has an executable file name. The predictive cache system then checks that the do not inherit flag is set. Provided that both conditions are satisfied, and that this is not the first time that the program is launched, the predictive cache system then loads the most frequently accessed memory blocks into the software disk cache as indicated by the memory block access profile. If this was the first time that the drawing program was launched on the computer then no memory block access profile would be available. The drawing program is then executed. The predictive cache system creates a new profile based on the memory block access during the program launch. A program launching process without the benefit of the predictive cache system may typically require about 12 seconds. Using the predictive cache system of the present invention may reduce the program launch time by 40% to about 5 seconds.

After the drawing program is launched it awaits user input. The predictive cache system detects the idle period of the program while the program awaits user input, and stops profiling the memory block access. The user may then begin to draw in a new file or open an existing drawing file.

After creating a drawing a user may want to enhance the drawing with digital imaging effects. The user then selects the digital imaging effects module. The predictive cache system may then identify that this is a module that has a memory block access profile. If so, the predictive cache system pre-loads the most frequently accessed memory blocks in the launching of the digital imaging effects module. Similar to the launching of the main executable program, the predictive cache creates a new memory block access profile during the launch of the module. The system stops the profiling process after an idle period of a predetermined length is detected, or when the timeout period expires.

The following computer code listing provides an example of one embodiment of the present invention:

```
;************************************************************************  ;*
; FASTLOAD.VXD - (C) 1996 Damon Cusato - Quarterdeck Corporation
;************************************************************************

.386p
            .xlist
            INCLUDE VMM.INC
            INCLUDE V86MMGR.INC
            INCLUDE IFSMGR.INC
            INCLUDE IFS.INC
            INCLUDE VWIN32.INC
            INCLUDE VCACHE.INC
            INCLUDE QEMMC.EQU
            INCLUDE MYMACROS.INC
            INCLUDE FASTLOAD.INC
            INCLUDE CACHBAK.INC DEBUG                   EQU     0
    TURBO_NON_EXES          EQU     0
    GRAB_MEM_AT_INIT        EQU     0
    OLD_TURBO               EQU     0
    TURBO_EXPLORER          EQU     0
        FAST_DEV_ID             EQU    93EH   ; as assigned from MicroSoft.
    WORRY_ABOUT_CACHE_SHRINK EQU    1
    VARIABLE_BUFFER         EQU  0

Declare_Virtual_Device TRBOLOAD,\
                                1,\
                                0,\
                                FASTLOAD_Control,\
                                Fast_Dev_ID,\
                                IFSmgr_Init_Order+1000h,\ if VARIABLE_BUFFER
    VxD_IDATA_SEG

REGBUFSIZE      equ 256
    RegistryBuf     db REGBUFSIZE dup (0)
    RegType         dd REG_SZ
    RegSize         dd REGBUFSIZE Quarterdeck_INI_Section label byte
```

```
                `db   "Quarterdeck_TurboLoad",0
        TL_Buffer label byte
                db   "Buffer",0

5       VxD_IDATA_ENDS
        endif ; VARIABLE_BUFFER

VxD_LOCKED_DATA_SEG 10              public FL_BufferSize
                public TL_Memory
                public TurboLoadStatus
                public Version 15      DEFAULT_BUFF_SIZE                       equ     32      ; in K
        MIN_VCACHE_SIZE                         equ     (Sixty_Four_K * 2)
        DEFAULT_BASE_DELAY                      equ     7000    ; In milliseconds
        DEFAULT_MEG_DELAY           equ     2000    ; In milliseconds
        DELAY_MEM_THRESHOLD                     equ     3873    ; In pages
20      TWO_MEG                                 equ     (ONE_MEG * 2)
        LONGEST_EXEC_FILE_NAME  equ     255
        CHUNK_SIZE                              equ     Thirty_Two_K
        LAST_CHUNK                              equ     0FFH
        LearningBaseDelay                       equ     (Default_Base_Delay + )
25      CHUNK_CLIP_COUNT                        equ     9
        if VARIABLE_BUFFER
        MAX_BUFFPAGES                           equ     (ONE_MEG / Four_K) ; Clip size here
        MIN_BUFFPAGES                           equ     4       ; Pages
30      endif ; VARIABLE_BUFFER
        if WORRY_ABOUT_CACHE_SHRINK
        MAX_ALLOCATION_WORRY equ        (ONE_MEG * 3)
        endif 35      ;=====================================
        ; Smart App data
        ;=====================================

SmartREGBUFSIZE         equ 256
40      SmartRegistryBuf        db SmartREGBUFSIZE dup (0)
        SmartRegType            dd REG_BINARY SmartRegSize
        dd SmartREGBUFSIZE SortedChunkList         db SmartREGBUFSIZE dup (0)
45      Quarterdeck_SmartApp_Section label byte
                db   "Quarterdeck_TurboLoad\SmartApps",0

PreloadChunks                   dd      0
```

```
LearnFileHandle              dd    0
TableAddr                    dd    0
ir_position                  dd    0
TimeOutHandle                dd    0
RestrictedHandle             dd    0

PreloadBitMap                db    ((SmartREGBUFSIZE+7) / 8) dup (0)
CacheBakStatus               dd    0

;=========================================
;Turboload int 21h data
;=========================================
ChannelCounter               dd    0
FileSizeBytes                dd    0
Version                      dd    1
FL_BufferSize                dd    0
BaseDelay                    dd    DEFAULT_BASE_DELAY
MegDelay                     dd    DEFAULT_MEG_DELAY BuffPages                    dd    DEFAULT_BUFF_SIZE / 4

Delaytime                    dd    0
OldSysTime                   dd    0

OldFSD                       dd    0
TurboLoadStatus              dd    TL_UNINITIALIZED
TL_UNINITIALIZED             EQU   0      ; hooks not in place
TL_SUSPENDED                 EQU   1      ; Turboload turned off
TL_READY    EQU              2            ; hooks in place but not loading
TL_ACTIVE   EQU              3            ; Currently turboloading
;TL_NOIFS   EQU              4            ; Turboloading, allowing cache usage
TL_LEARN    EQU              5            ; Turboload is learning
TL_PENDING_REGISTRY          EQU   6      ; Write registry event pending RegEventFlags    EQU (PEF_WAIT_NOT_NESTED_EXEC+PEF_
               WAIT_STI+PEF_WAIT_NOT_CRIT+PEF_ALWAYS_SCHED)

MemoryInfo                   DemandInfoStruc <0>
OldInt2 dq                   0     ; Old int 21 address
CallBackAddress              dd    0

BufferAddr                   dd    ?     ; Linear addr of page for 'PE' parsing

Win16Exec dd                 0
FileHandle2                  dd    0     ; File handle of preload file ExecFileSize                 dd    0
```

```
        FileOffset              dd      0
        ByteCount               dd      0
        FileName                dd      0

5      EXE_Extension           db      ".EXE"
        DLL_Extension           db      ".DLL"
        align 4

TL_Memory dd                    0
10
        IFSFileName             db      (LONGEST_EXEC_FILE_NAME+1) dup (0)
        IFSFileSize             dd      0

ExecFileName            db      (LONGEST_EXEC_FILE_NAME+1) dup (0)
15      ExecFileNameSize        dd      0

TruncatedFilename       db      (LONGEST_EXEC_FILE_NAME+1) dup (0)

20      ExecPrevious            db      (LONGEST_EXEC_FILE_NAME+1) dup (0)
        ExecPrevSize            dd      0

VxD_LOCKED_DATA_ENDS
25
        VxD_ICODE_SEG

BeginProc Fastload_Init_Complete
30              cmp     [TurboloadStatus],TL_SUSPENDED
                jnz     KeepOff
                mov     [TurboloadStatus],TL_READY
                VxDcall CachBak_Get_Version
                jc      Done_Init_Complete
35              mov     [CacheBakStatus],1
        Done_Init_Complete:
                clc
                ret
        KeepOff:
40              stc
                ret EndProc FastLoad_Init_Complete 45      BeginProc FASTLOAD_Device_Init
        if VARIABLE_BUFFER
                call    ReadRegistryOptions     ; reg indicates I should turn on?
                jc      DevInit_Done            ; If not, abort with CY set
        endif
```

```
            call       AllocateMemory              ; Allocated buffer successfully?
            jc         DevInit_Done                ; If not, abort with CY set
            call       HookPMvector
            call       HookIFS
 5          call       CheckPhysPages
            call       SetIdleCallback mov        [TuboloadStatus],TL_SUSPENDED
            clc
10   DevInit_Done:
            RET InitFailed:                                    ; Abort with CY set
            stc                                     ; and status = TL_UNINITIALIZED
15          ret if VARIABLE_BUFFER
     ReadRegistryOptions proc
            mov        [TuboloadStatus],TL_SUSPENDED
20          mov        eax,DEFAULT_BUFF_SIZE
            mov        edi,offset32 TL_Buffer
            call       Get_Decimal_Int_Param
            shr        eax,K_to_Page
            cmp        eax,MAX_BUFFPAGES
25          jbe        short Buffer_Max_OK
            mov        eax,MAX_BUFFPAGES Buffer_Max_OK:
            cmp        eax,MIN_BUFFPAGES
30          jae        short Buffer_Min_OK
            mov        eax,MIN_BUFFPAGES
     Buffer_Min_OK:
            mov        [BuffPages],eax
            clc
35          ret
     ReadRegistryOptions endp BeginProc Get_Decimal_Int_Param
40          call       GetRegistryString
            jc         short GDIP_Done             ; CY set if no registry entry
     for us
            mov        esi,eax                     ; Save the default value
            mov        edx,OFFSET32 RegistryBuf
45          VMMcall Convert_Decimal_String
            cmp        edx,OFFSET32 RegistryBuf
            jne        short GDIP_Done             ; If past the beginning, it's
     good
            mov        eax,esi                     ; At the beginning: bad, use
```

```
        default
GDIP_Done:
        test        eax,eax                 ; Value of zero?
        jnz         GDIP_ReallyDone
        mov         eax,esi                 ; If so, use default
GDIP_ReallyDone:
        ret
EndProc Get_Decimal_Int_Param BeginProc GetRegistryString
        pushad
        push        eax                     ; Placeholder on stack for HKEY
        mov         esi,esp
        VMMcall _GetRegistryKey, <REGTYPE_VXD, \
        <OFFSET32 Quarterdeck_INI_Section>, REGKEY_OPEN, esi>
        test        eax,eax
        jnz         short GRS_No_Registry mov         RegSize,REGBUFSIZE
        mov         RegistryBuf,0
        VMMCall _RegQueryValueEx,<[esi], edi, 0, OFFSET32 RegType, \
                                OFFSET32 RegistryBuf, OFFSET32 RegSize>
        VMMcall _RegCloseKey,<[esi]>
        clc
        jmp         short GRS_Done
GRS_No_Registry:
        stc
GRS_Done:
        pop         eax
        popad ret
EndProc GetRegistryString
endif ; if VARIABLE_BUFFER HookIFS proc
        VxDcall IFSMgr_InstallFileSystemApiHook <offset32 IfsManager>
        mov         eax,[eax]
        mov         [OldFSD],eax
        ret
HookIFS endp AllocateMemory proc
        VMMcall _PageAllocate,<BuffPages,PG_SYS,0,0,0,0,<OFFSET32
BufferAddr>,PAGELOCKED> ;
        nolonger locked test    eax,eax     ; Linear address of 0 is failure
        jz          AllocFailed
        mov         [BufferAddr],eax        ; Save base linear address
```

```
            mov         eax,[BuffPages]
            shl         eax,Page_to_Bytes       ; Convert from 4K pages to bytes
            mov         [FL_BufferSize],eax 5          VMMcall   _PageAllocate,<1,PG_SYS,0,0,0,0,<OFFSET32
        TableAddr>,PAGELOCKED>
            test        eax,eax
            jz          AllocFailed
            mov         [TableAddr],eax
10
            clc
            ret
        AllocFailed:
            stc
15          ret
        AllocateMemory endp CheckPhysPages proc
            mov         esi,offset32 MemoryInfo ; Point ESI at a DemandInfoStruc
20          VMMcall  _GetDemandPageInfo,<esi,0> ; Fills in the
            DemandInfoStruc mov eax, [esi.DIPhys_Count]
            cmp         eax,DELAY_MEM_THRESHOLD ; Delay less on high
        memory systems
            jbe         CPP_SetMem              ; Jump if low memory
25      system
            shr         [MegDelay],1            ; Double the delays on low memory sys
            shr         [BaseDelay],1
        CPP_SetMem:
            shl         eax,Page_to_Bytes
30          mov         [TL_Memory],eax
            clc
            ret
        CheckPhysPages endp 35      HookPMvector proc
            mov         eax,21h
            VMMcall Get_PM_INT_Vector
            mov         dword ptr OldInt21,edx
            mov         dword ptr OldInt21+4,ecx
40
        ;   xor         edx,edx                 ; No reference data
            mov         esi,offset32 TurboloadInt21
            VMMcall Allocate_PM_Call_Back   ; Returns EAX =
        selector:offset16
45          mov         [CallBackAddress],eax movzx       edx,ax                  ; EDX is offset
            xchg        eax,ecx
            shr         ecx,10h                 ; ECX is segment
```

```
            xor       eax,eax
            mov       al,21h
            VMMcall   Set_PM_Int_Vector
            clc
 5          ret
      HookPMvector endp SetIdleCallBack proc 10          mov       esi, OFFSET32 Turboload_Idle    ; Idle callback routine
            VMMcall   Call_When_Idle                  ; set idle callback
            ret                                       ;

15    SetIdleCallBack endp

EndProc FASTLOAD_Device_Init

VxD_ICODE_ENDS
20
      VxD_LOCKED_CODE_SEG extern FASTLOAD_DIOC_Entry:near

25    BeginProc TurboloadInt21
            cld
      ; LWM delete >>
      ;     cmp       [TurboLoadStatus],TL_LEARN
      ;     je        NoPreload
30    ; LWM delete <<
            call      CheckTLStatus
            jc        NoPreload
            call      CheckIfExec         ; Is function code a load request?
35          jc        NoPreLoad           ; Jump if not
            call      GetFileName         ; Is file name one we want to turbo?
            jc        NoPreload           ; Jump if not
            call      CheckIfPrevious     ; Same file as last turbo?
40          jc        NoPreLoad           ; If so, assume multiple open/close IF DEBUG
      ;     int       1h
45    ENDIF  ; DEBUG call      InitRegistryBuf
            call      CheckSmartAppList   ; Search through the EXE's we know
            jnc       Preload             ; Found app in SmartList
```

```
            ; call       InitRegistryBuf         ; zero smartregbuf and
       sortedchunklist
            call        CheckIfPE
            jc          NoPreload
            mov         [TurboLoadStatus],TL_LEARN
            call        SetupGlobalTimeOut
            jmp         NoPreload Preload:
            call        DoPreLoad               ; Read the file into cache NoPreLoad:
            mov         ecx,dword ptr OldInt21+4
            mov         dx,dword ptr OldInt21
            VMMcall     Simulate_Far_Jmp
            RET InitRegistryBuf proc
            mov         edi,offset32 SmartRegistryBuf
            mov         ecx,SMARTREGBUFSIZE shr 2
            xor         eax,eax
            rep         stosd mov         edi,offset32 SortedChunkList
            mov         ecx,SMARTREGBUFSIZE shr 2
            rep         stosd
            ret
       InitRegistryBuf endp SetupGlobalTimeOut proc
            ;mov        eax,[BaseDelay]
            ;sub        [DelayTime],eax
            ;mov        eax,[LearningBaseDelay]
            ;add        [DelayTime],eax mov         eax,[DelayTime]
            xor         esi,esi
            xchg        si,[TimeOutHandle]
            VMMcall     Cancel_Time_Out
            mov         eax,[DelayTime]
            xor         edx,edx
            mov         esi,offset32 TurboLoad_Timeout
            VMMcall     Set_Global_Time_Out
            mov         [TimeOutHandle],esi
            call        LogSystemTime
            ret
       SetupGlobalTimeOut endp
```

```
       CheckSmartAppList proc
              pushad
              push        eax             ; Placeholder on stack for HKEY
              mov         esi,esp
 5            VMMcall _GetRegistryKey, <REGTYPE_VXD, \
              <OFFSET32 Quarterdeck_SmartApp_Section>, REGKEY_OPEN, esi>
              test        eax,eax
              jnz         short RFL_No_Registry 10            mov         SmartRegSize,SmartREGBUFSIZE
              mov         SmartRegistryBuf,0
              VMMCall _RegQueryValueEx,<[esi], OFFSET32 TruncatedFileName, 0,
                            OFFSET32 SmartRegType, \ OFFSET32
                            SmartRegistryBuf, OFFSET32 SmartRegSize>
15            push        eax
              VMMcall _RegCloseKey,<[esi]>
              pop         eax
              test        ax,eax
              jz          short RFL_Done   ; Return with CF clear
20     RFL_No_Registry:
              stc
       RFL_Done:
              pop         eax
              popad
25
              ret
       CheckSmartAppList endp 30
       Comment {TurboExplorer}
       IsShellLoaded proc
              cmp         [ExplorerLoaded],1
              jne         SkipS
35            clc
              ret SkipS: stc
              ret
40     IsShellLoaded endp
       End Comment {TurboExplorer}

LogSystemTime proc
              VMMcall Get_System_Time
45            mov         [OldSysTime],eax
              ret
       LogSystemTime endp CheckDelayTime proc
```

```
        push    eax
        VMMcall Get_System_Time
        sub     eax,[OldSysTime]
        cmp     eax,[DelayTime]
5       pop     eax
        ret
    CheckDelayTime endp CheckTLStatus proc
10  ; ========================================
    ; | If active and timer not expired, do not start another Turbo
    ; | If active and timer expired, stop previous Turbo and start another ;
    ; ========================================
    ; LWM add >>
15      cmp     [TurboLoadStatus],TL_SUSPENDED
        je      SkipDecCount
        cmp     [TurboLoadStatus],TL_PENDING_REGISTRY
        je      SkipDecCount
    ; LWM add <<
20      cmp     [TurboloadStatus],TL_ACTIVE
        je      CheckTimer
    ; LWM add >>
        cmp     [TurboloadStatus],TL_LEARN
    ; LWM add <<
25  ; LWM delete >>
    ;   je      CheckTimer
    ;   cmp     [TurboLoadStatus],TL_NOIFS
    ; LWM delete <<
        jne     NewFile
30  CheckTimer:
        call    CheckDelayTime
        jb      SkipDecCount
    ; LWM add >>

35      push    eax
        push    esi
        xor     esi,esi
        xchg    esi,[TimeOutHandle]
        VMMcall Cancel_Time_Out
40      pop     esi
        pop     eax call    EndLearningMode
        cmp     [TurboloadStatus],TL_READY
45      jne     SkipDecCount
    ; LWM add <<

NewFile:
        mov     [TurboloadStatus],TL_READY
```

```
            clc
            ret
     SkipDecCount:
5           stc
            ret CheckTLStatus endp 10   DoPreLoad proc
     IF DEBUG
            int 1h
     ENDIF  ; DEBUG 15          call       OpenFileIO              ; Try to open file being exec-
     ed
            jc         PreloadFail2            ; Don't Turbo on open failure
            mov        [FileHandle2],eax       ; Log handle returned by
     OpenFileIO
20          call       LogUsableCacheSize      ; Log the bytes of Vcache we'll
     use
            jc         PreloadFail             ; CY set if Vcache is smaller then min
     size
            call       CheckIfOpenPE
25          jc         PreloadFail
            call       FigureDelay             ; Add # of Meg_Delays to Base_Delay
            mov        [TurboLoadStatus],TL_ACTIVE
            call       SortChunks
            mov        esi,offset32 PreloadBitmap
30          mov        ecx,1                   ; Skip zero-eth chunk
     StuffTheChannel:
            btr        dword ptr [esi],ecx
            jnc        NextChunk 35          mov        eax,CHUNK_SIZE
            mul        ecx
            mov        edx,eax
            push       cx
            push       esi
40          call       ReadFileIO
            pop        esi
            pop        cx
            jc         PreloadFail 45   NextChunk:
            inc        ecx
            cmp        cx,SmartREGBUFSIZE
            jb         StuffTheChannel
```

```
        FileDone2:
                cmp         ecx,2                           ; If we only preloaded 2 chunks
                jbe         PreloadFail                     ; Don't bother locking out the
        cache.
  5             call        InitRegistryBuf                 ; zero out our buffer for new
        learn
                call        SetupGlobalTimeOut
                call        CloseFileio
                ret
 10
        PreloadFail:
                call        CloseFileio
        PreloadFail2:
                mov         [TurboloadStatus],TL_READY
 15             ret SortChunks proc
                mov         edi,offset32 PreloadBitmap
                xor         eax,eax
 20
                mov         esi,offset32 SmartRegistryBuf
                mov         ecx,[PreloadChunks]
                cmp         ecx,SmartREGBUFSIZE
                jbe         TopOfSort
 25             mov         ecx,SmartREGBUFSIZE TopOfSort:
                lodsb
                cmp         al,LAST_CHUNK
 30             je          Sorted
                bts         dword ptr [edi],eax
                loop        TopOfSort
        Sorted:
                ret
 35     SortChunks endp CheckIfOpenPE proc
                xor         edx,edx
                call        ReadFileIO
 40             jc          CIOP_Failed
                cmp         eax, 81H
                jbe         CIOP_Failed
                cmp         word ptr [esi+80H],4550h
                je          CIOP_Done                       ; Return with NC
 45     CIOP_Failed:
                stc
        CIOP_Done:
                ret
        CheckIfOpenPE endp
```

```
        CheckIfPE proc call        OpenFileIO
 5              jc          CIP_Failed
                mov         [FileHandle2],eax mov         eax,R0_READFILE
                mov         ebx,[FileHandle2]
10              mov         ecx,256
                mov         edx,0
                mov         esi,[BufferAddr]
                VxDcall     IFSMgr_Ring0_FileIO
                call        FigureDelay
15
                call        CloseFileIO cmp         word ptr [esi+80H],4550h
                jne         CIP_Failed
20              clc
                ret CIP_Failed:
                stc
25              ret CheckIfPE endp FigureDelay proc
30      ; =======================================
        ; | Calculate the DelayTime variable
        ; =======================================
                mov         ecx,[BaseDelay]

35              mov         ebx,[FileHandle2]
                mov         eax,R0_GetFileSize
                VxDcall     IFSMgr_Ring0_FileIO
                mov         [FileSizeBytes],eax 40              shr         eax,20                      ; Bytes to meg
                mul         [MegDelay]
                add         ecx,eax                     ; Add in meg delays DelayDone:
45              mov         [DelayTime],ecx
                ret FigureDelay endp
```

```
        OpenfileIO proc
;       ========================================
;   |   Returns EAX as file handle (or CY set on open error)
;       ========================================
 5          mov     bx,0                            ; access/sharing (Read only)
            mov     cx,1                            ; file attributes (Read only)
            mov     dx,1                            ; Open file, fail if does not exist
            mov     esi,offset32 ExecFileName
            mov     eax,R0_OPENCREATFILE
10          VxDcall IFSMgr_Ring0_FileIO
            ret
        OpenFileIO endp ReadFileIO proc
15      ========================================
;   |   Returns EAX as bytes read (or CY set on read error)
;       ======================================== mov     eax,R0_READFILE
20          mov     ebx,[FileHandle2]
            mov     ecx,CHUNK_SIZE
            mov     esi,[BufferAddr]

VxDcall IFSMgr_Ring0_FileIO
25          ret
        ReadFileIO endp

CloseFileIO proc
            mov     eax,R0_CloseFile
30          xor     ebx,ebx
            xchg    ebx,[FileHandle2]
            VxDcall IFSMgr_Ring0_FileIO
            ret
        CloseFileIO endp
35
        DoPreLoad endp CheckIfExec proc
40      ;   ========================================
        ;   |   Returns CY set if not an exec call
        ;   |   Also, sets up Win16Exec variable
        ;       ========================================      movzx
                ebx,[ebp.Client_BX]
45          cmp     bl,OPEN_FLAGS_NOINHERIT jne CIE_NotExec
            ; test  [ebp.Client_BX],0A0H
            ; jz    CIE_NotExec
            mov     [Win16Exec],1
            movzx   eax,[ebp.Client_AX]
```

```
            cmp         h,4bh
            je          CIE_IsExec
            cmp         ax,716ch
            jne         CIE_NotExec
 5          cmp         [ebp.Client_DX],1
            je          CIE_Win32Exec
    CIE_NotExec:
            stc
            ret
10  CIE_Win32Exec:
            dec         [Win16Exec]              ; Clear flag (dec from 1 to 0)
    CIE_IsExec:
            clc
            ret
15  CheckIfExec endp GetFileName proc
    ; ==========================================
    ; | Logs name of file being exec-ed into ExecFileName
20  ; | Logs length of file name into ExecFileSize
    ; | Checks if shell is loading and sets ExplorerLoaded flag if so
    ; | Returns CY set if:
    ; |     (a) an invalid file name, or
    ; |     (b) file name does NOT end with '.EXE', or
25  ; |     (c) file name matches the shell
    ; ==========================================
            mov         al,Client_DX
            cmp         [Win16Exec],0
            jne         GetString
30          mov         al,Client_SI GetString:
            mov         ah,Client_DS
            VMMcall Map_Flat
35          cmp         eax,-1
            je          NotValidExec mov         esi,eax
            VMMcall _lstrlen, <eax>
40          cmp         eax,LONGEST_EXEC_FILE_NAME
            ja          NotValidExec
            cmp         eax,4                    ; Long enough for '.EXE'?
            jbe         NotValidExec
            mov         [ExecFilesize],eax
45          xchg        ecx,eax                  ; Length -> ECX
            mov         edi,offset32 ExecFileName
            push        edi
            rep         movsb                    ; copy to my buffer
            xor         al,al                    ; store a null
```

```
            stosb
            pop         edi
            VMMcall  _strupr, <edi>            ; convert to upper case
            mov         esi,offset32 EXE_Extension
 5          add         edi,[ExecFileSize]
            mov         ecx,4
            sub         edi,ecx                ; Point at fourth-to-last char of
       name
        ;   mov         edx,edi                ; save ptr
10
            repe        cmpsb
            jne         NotValidExec
        ;   je          ValidFile
        ;   mov         ecx,4
15      ;   mov         esi,offset32 DLL_Extension
        ;   mov         edx,edi
        ;   repe        cmpsb
        ;   jne         NotValidExec 20  ValidFile:

jmp         short SomeOne

NotValidExec:
25          stc
            ret
    SomeOne:
            clc                                 ;
            ret
30
    GetFileName endp CheckIfPrevious proc
    ;   =======================================
35  ;   |  Returns CY if current file being exec-ed matches last Turbo-ed file ;
    ;   =======================================
            mov         ax,7160h
            mov         cx,1
            mov         esi,offset32 ExecFileName
40          mov         edi,offset32 TruncatedFilename
            VxDint      21h cld
            mov         esi,offset32 TruncatedFileName
45          VMMcall  _lstrlen, <offset32 TruncatedFileName>
            mov         ecx,eax mov         edi,offset32 ExecPrevious
            cmp         byte ptr [edi],0        ; 1st file?
```

72841.1185

```
            jz         StoreFileName
            push       ecx
            push       esi
            push       edi
            repe       cmpsb
            pop        edi
            pop        esi
            pop        ecx
            je         SkipFileCheck
    StoreFileName:
            mov        [ExecPrevSize],ecx
            rep        movsb
            clc
            ret SkipFileCheck:
            stc
            ret
    CheckIfPrevious endp LogUsableCacheSize proc
    ; ========================================
            xor        eax,eax
            VxDcall    Vcache_GetSize xor        esi,esi                    ; ESI = amount cache might shrink
    if WORRY_ABOUT_CACHE_SHRINK
    ; Calculate VMM's target for VCache
            sub        edx,ecx                    ; Sub minimum size from max. size
            shr        edx,2                      ; Divide that by 4
            add        ecx,edx                    ; Add in the minimum (ECX=target)
            cmp        ecx,eax                    ; Is target above current?
            jae        LUCS_CheckCacheBak
            mov        esi,eax
            sub        esi,ecx                    ; ESI = amount cache might
    shrink
    LUCS_CheckCacheBak:
    endif mov        ebx,eax                    ; save total vcachesize cmp        [CacheBakStatus],0
            je         IgnoreCacheBack mov        eax,CachBak_API_Get_CachBak_Mem
            VxDcall    CachBak_Call_API
            shr        eax,Bytes_To_Page
            cmp        esi,eax                    ; Will cache shrink more than
    CacheBack?
```

```
                ja         IgnoreCacheBack
                xchg       eax,esi                    ; Larger number -> ESI
        IgnoreCacheBack:

5              sub        ebx,esi
                shl        ebx,Page_to_Bytes
                mov        eax,ebx cmp        eax,MIN_VCACHE_SIZE
10              jb         CacheTooSmall shr        eax,4                      ; Take 15/16ths of usable cache
                sub        ebx,eax
                shr        ebx,Bytes_to_32k
15              mov        [PreloadChunks],ebx
                clc
                ret
        CacheTooSmall:
                stc
20              ret
        LogUsableCacheSize endp EndProc TurboloadInt21

25      EndLearningMode proc
                pushad
                mov        [LearnFileHandle],0
                xor        eax,eax
                VMMcall Get_Sys_VM_Handle
30              mov        ecx,RegEventFlags
                xor        edx,edx
                mov        esi,offset32 WriteNewSmartAppToRegistry
                xor        di,edi
                VMMcall Call_Restricted_Event
35              mov        [RestrictedHandle],esi
                mov        eax,TL_READY
                test       esi,esi
                jz         short no_event
                mov        eax,TL_PENDING_REGISTRY
40      no_event:
                mov        [TurboLoadStatus],eax
                popad
                ret
        EndLearningMode endp
45
        BeginProc Turboload_Timeout xor        eax,eax
                xchg       eax,[TimeOutHandle]
```

```
            test        eax,eax
            jz          ttComplete              ; cancelled
            call        ChangeTLStatus
ttComplete:
            ret EndProc Turboload_Timeout BeginProc Turboload_Idle xor         si,esi
            xchg        esi,[TimeOutHandle]
            VMMcall Cancel_Time_Out
            call        ChangeTLStatus
            ret EndProc Turboload_Idle BeginProc ChangeTLStatus cmp         [TurboloadStatus],TL_LEARN
            je          CleanUpLearningMode
            cmp         [TurboloadStatus],TL_ACTIVE  ; Turboing?
            je          CleanUpLearningMode NothingToDo:
            clc
            ret CleanUpLearningMode:

IF DEBUG
            int 1h
ENDIF   ; DEBUG
            call        EndLearningMode
            stc
            ret BeginProc WriteNewSmartAppToRegistry
            push        ax                      ; Placeholder on stack for HKEY
            xor         esi,esi
            xchg        esi,[RestrictedHandle]
            or          esi,esi
            jz          CLM_Cancel
            call        SortChunkList
            mov         esi,esp
            VMMcall _GetRegistryKey, <REGTYPE_VXD, \
                <OFFSET32 Quarterdeck_SmartApp_Section>,REGKEY_OPEN, esi>
            test        eax,eax
```

```
                jnz         short CLM_No_Registry

VMMcall     _RegSetValueEx,<[esi], OFFSET32 TruncatedFileName,\
                            0, OFFSET32 SmartRegType, OFFSET32 SortedChunkList, SmartRegSize>

VMMcall     _RegCloseKey,<[esi]>
                clc
                jmp         short CLM_Done
        CLM_No_Registry:
                stc
        CLM_Done:
                mov         [TurboLoadStatus],TL_READY
        CLM_Cancel:
                pop         eax
                ret
        EndProc WriteNewSmartAppToRegistry SortChunkList proc
                mov         esi,offset32 SmartRegistryBuf    ; List of unsorted chunks
                mov         edi,offset32 SortedChunkList
                mov         ecx,CHUNK_CLIP_COUNT+1

SetNewClipCount:

dec         cl
                cmp         cl,1
                je          DoneSorting
                xor         eax,eax SearchSmartRegistryBuf:

cmp         byte ptr [esi+eax],cl
                jae         SaveToSorted
                inc         eax
                cmp         al,SMARTREGBUFSIZE-1             ; LAST_CHUNK
                jne         SearchSmartRegistryBuf
                jmp         SetNewClipCount SaveToSorted:
                mov         byte ptr [edi],al                ; save the chunk #
                inc         edi                              ; increment the list ptr
                mov         byte ptr [esi+eax],0             ; zero out unsorted entry
                jmp         SearchSmartRegistryBuf DoneSorting:
                mov         byte ptr [edi],LAST_CHUNK        ; Set end of list
                inc         edi
                mov         esi,offset32 SortedChunkList     ; Reload start of sortchunklist
```

```
                sub         edi,esi                         ; Find out the number of
        entries
                mov         [SmartRegSize],edi              ; Save count for reg writing
                ret
        SortChunkList endp EndProc ChangeTLStatus
;****************************************************************************
* FileSystemAPIHookStructure     struc
        FSDFnAddress                    dd      ?
        FunctionNumber                  dd      ?
        Drive                           dd      ?
        ResourceFlags                   dd      ?
        CodePage                        dd      ?
        PIOReq                          dd      ?
FileSystemAPIHookStructure              ends LocalVars       struc
        LocalFSDFnAddress               dd      ?
         LocalFunctionNumber            dd      ?
        LocalDrive                      dd      ?
        LocalResourceFlags              dd      ?
        LocalCodePage                   dd      ?
        LocalPIOReq                     dd      ?
        SystemReturnAddress             dd      ?
        LocalEAX                        dd      ?
        LocalEBP                        dd      ?
        ; Time                          dd      ?
LocalVars ends
;IFSMgr_Status           dd      IFSM_BORED
;IFSM_BORED              EQU     0       ; IFSMgr has nothing special to do
;IFSM_LEARNING           EQU     1       ; In learning mode Old_Fsd_Flag                    dd      FSD_OPEN
FSD_OPEN                equ     0
FSD_READ                qu      1
FSD_CLOSE               eq      2

BeginProc IFSManager cmp     [TurboLoadStatus],TL_LEARN
        je      LearningMode cmp     [TurboLoadStatus],TL_ACTIVE     ; If active let's block
        je      IFSM_ActiveButLearning          ;

IFSM_NotActive:
```

```
                jmp         OldFSD

IFSM_NotOpen:
                pop         ebp
5               jmp         OldFSD IFSM_ActiveButLearning:
                push        ebp
                lea         ebp, [esp+8]
10              cmp         FunctionNumber[ebp], IFSFN_Open
                jne         IFSM_NotOpenLearn mov         ebp, PIOReq[ebp]
                or          ir_options[ebp], OPEN_FLAGS_NO_CACHE
15  IFSM_NotOpenLearn:
                pop         ebp LearningMode:
    IF DEBUG
20              int 1h
    ENDIF       ; DEBUG push        ebp
                lea         ebp, [esp+8]          ; get file function
25              cmp         [LearnFileHandle],0   ; do we have an open handle?
                jnz         IFS_StillValid        ; Yes? Then just check for
                cmp         FunctionNumber[ebp], IFSFN_Open   ; file close or read
                je          IFSL_Open
                jmp         IFSL_Exit
30  IFS_StillValid:
                cmp         FunctionNumber[ebp], IFSFN_Close
                je          IFSL_Close
                cmp         FunctionNumber[ebp], IFSFN_Read
                je          IFSL_Read
35
    IFSL_Exit:
                pop         ebp
                jmp         IFSM_NotActive        ; exit 40  ;------------------------------
    ;IFSL_OPEN should be complete
    ;------------------------------

IFSL_Open:
45  IF DEBUG
                int 1h
    ENDIF ; debug call        IFSM_CheckFileName    ; Check to see if
```

```
        they are
            jc          IFSL_Exit                       ; reopening the
        file we want
            mov         [Old_FSD_Flag],FSD_OPEN         ; setup CALL_OLD_FSD
 5      for OPEN
            call        Call_OldFSD                     ; either we got it
        or didn't
            add         esp,4                           ; we'll keep checking till
            ret                                         ; idle.
10
        ;-------------------------------------------------
        ;IFSL_CLOSE : Should be code complete except for IFSL_NotOurHandle ;----
        ;-------------------------------------------------
        IFSL_Close:
15      IF DEBUG
            int 1h
        ENDIF ; Debug push        ebp
20          mov         ebp, PIOReq[ebp]
            mov         ebp, ir_fh[ebp]                 ; get filehandle
            cmp         ebp, [LearnFileHandle]          ; is it ours?
            pop         ebp
            jnz         IFSM_NotOpen                    ; no? get out
25          mov         [Old_Fsd_Flag],FSD_Close        ; setup for a 'CLOSE'
        return
            cal         Call_OldFSD                     ; call down the
        chain
            add         esp,4
30          ret                                         ; return to system

;-------------------------------------------------

35      ;---------------------------
        ;IFSL_READ: This should be code complete
        ;---------------------------

IFSL_Read:
40      IF DEBUG
            int 1h
        ENDIF   ; DEBUG
            push        ebp
            mov         ebp, PIOReq[ebp]
45          mov         ebp, ir_fh[ebp]                 ; get filehandle
            cmp         ebp, [LearnFileHandle]          ; is it ours?
            pop         ebp
            jnz         IFSM_NotOpen                    ; no? get out
            mov         [Old_Fsd_Flag],FSD_READ         ; setup for a read
```

```
        return
                push        ebp
                mov         ebp, PIOReq[ebp]
                mov         ebp,ir_pos[ebp]
 5              mov         ir_position,ebp
                pop         ebp
                call        Call_OldFSD              ; call down the
        chain
                add         esp,4
10              ret                                  ; return to system

;-----------------------------------------------------------------

15      ;==========================================
        ;¦ Takes nothing, returns CY if file is not cacheable or Filename doesn't ;¦ equal ExecFileName
        ;==========================================
        IFSM_CheckFileName
20      proc
                push        eax
                push        ebx
                push        ecx
                push        edx
25              push        esi
                push        edi
                push        ebp mov         ebp, PIOReq[ebp]
30      ;       test        ir_options[ebp], OPEN_FLAGS_NO_CACHE
        ;       jnz         short IFSM_CacheFlagNotSet mov         eax, ir_ppath[ebp]       ; point esi to ireq
                add         eax,4
35              mov         edi,offset32 IfsFileName
                VxdCall UniToBCSPath<edi,eax,LONGEST_EXEC_FILE_NAME,BCS_WANSI> mov         ecx,[ExecFileSize]
                sub         ecx,2                    ; Ignore drive letter and colon
40              mov         esi,(offset32 ExecFileName)+2
                repe        cmpsb
                je          IFSM_FileNameIsGood
                ;or         ir_options[ebp],OPEN_FLAGS_NO_CACHE
        IFSM_CacheFlagNotSet:
45              stc
        IFSM_FileNameIsGood:
                pop         ebp
                pop         edi
                pop         esi
```

```
            pop         edx
            pop         ecx
            pop         ebx
            pop         eax
5           ret
    IFSM_CheckFileName endp 10  Call_OldFSD proc
    IF DEBUG
            int         1h
    ENDIF       ; DEBUG
            sub         esp, size LocalVars
15          mov         LocalEAX[esp], eax mov         eax, FSDFnAddress[ebp]
            mov         LocalFSDFnAddress[esp], eax
            mov         eax, FunctionNumber[ebp]
20          mov         LocalFunctionNumber[esp], eax
            mov         eax, Drive[ebp]
            mov         LocalDrive[esp], eax
            mov         eax, ResourceFlags[ebp]
            mov         LocalResourceFlags[esp], eax
25          mov         eax, CodePage[ebp]
            mov         LocalCodePage[esp], eax
            mov         eax, PIOReq[ebp]
            mov         LocalPIOReq[esp], eax 30          mov         LocalEBP[esp], ebp
            mov         ebp, [ebp-8]

call        OldFSD
35
            xchg        LocalEBP[esp], ebp
            mov         LocalEAX[esp], eax push        esi
40          mov         esi, PIOReq[ebp]
            cmp         ir_error[esi], 0
            jnz         short OpenFailed cmp         [Old_Fsd_Flag],FSD_OPEN
45          je          COF_FSD_OPEN
            cmp         [Old_Fsd_Flag],FSD_READ
            je          COF_FSD_READ
            cmp         [Old_Fsd_Flag],FSD_CLOSE
            je          COF_FSD_CLOSE
```

```
                jmp         OpenFailed              ; Fall through
        COF_FSD_OPEN:
                cmp         ir_options[esi], ACTION_OPENED
                jnz         short OpenFailed
 5              push        ecx
                mov         ecx, ir_fh[esi]
                mov         [LearnFileHandle],ecx
                pop         ecx
                jmp         short OpenWorked
10      COF_FSD_READ:
                push        eax
                push        ebx
                push        ecx
                mov         ecx,ir_length[esi]
15              jecxz       CDF_DoneReadProcessing  ; Nothing to log if nothing read
                mov         ebx,ir_position         ; EBX = first byte read
                lea         ecx,[ecx+ebx-1]         ; ECX = last byte read
                shr         ebx,Bytes_To_32K        ; EBX = first chunk read
20              shr         ecx,Bytes_To_32K        ; ECX = last chunk read
                mov         esi,offset32 SmartRegistryBuf
        CDF_NextByte:
25              cmp         ebx,SMARTREGBUFSIZE-1   ; is this chunk to large?
                jae         CDF_DoneReadProcessing
                inc         byte ptr [esi+ebx]
                jnz         CDF_IncChunk
30              dec         byte ptr [esi+ebx]
        CDF_IncChunk:
                inc         ebx
                cmp         ebx,ecx
                jbe         CDF_NextByte
35      CDF_DoneReadProcessing:
                pop     ecx
                pop     ebx
                pop     eax
                jmp     short OpenWorked
40      COF_FSD_CLOSE:
                mov         [LearnFileHandle],0
                jmp         OpenWorked OpenFailed:
45      OpenWorked:
                pop         esi mov         eax, LocalFSDFnAddress[esp]   ; move parameters
                mov         FSDFnAddress[ebp], eax        ;back on stack
```

```
            for caller
                    mov         eax, LocalFunctionNumber[esp]
                    mov         FunctionNumber[ebp], eax
                    mov         eax, LocalDrive[esp]
 5                  mov         Drive[ebp], eax
                    mov         eax, LocalResourceFlags[esp]
                    mov         ResourceFlags[ebp], eax
                    mov         eax, LocalCodePage[esp]
                    mov         CodePage[ebp], eax
10                  mov         eax, LocalPIOReq[esp]
                    mov         PIOReq[ebp], eax mov         ebp, LocalEBP[esp]
                    mov         eax, LocalEAX[esp]
15                  add    esp, size LocalVars
                    ret Call_OldFSD endp 20      EndProc IFSManager BeginProc FASTLOAD_Exit
                    xor         esi,esi
                    xchg        esi,[TimeOutHandle]
25                              VMMcall Cancel_Time_Out
                    xor         esi,esi
                    xchg        esi,[RestrictedHandle]
                    VMMcall Cancel_Restricted_Event
                    mov         [TurboLoadStatus],TL_Suspended
30                  clc
                    ret
        EndProc         FASTLOAD_Exit BeginProc Fastload_Control
35              Control_Dispatch W32_DeviceIOControl, FASTLOAD_DIOC_Entry
                Control_Dispatch Device_Init, FASTLOAD_Device_Init
                Control_Dispatch Init_Complete, FASTLOAD_Init_Complete
                 Control_Dispatch Sys_VM_Terminate, FASTLOAD_Exit
                Control_Dispatch System_Exit, FASTLOAD_Exit
40              clc
                ret
        EndProc Fastload_Control VxD_LOCKED_CODE_ENDS
45
                END
```

Thus a predictive cache system has been described. Although the present invention has been described with respect to certain specific embodiments, it will be clear to those skilled in the art that the inventive features of the present invention are applicable to other embodiments as well, all of which are intended to fall within the scope of the present invention.

We claim:

1. A method for loading a cache in a computer system comprising the steps of:

monitoring memory access to identify at least one type of memory access process;

mapping a first region of memory, defined by a first memory access process of said at least one type of memory access process, into a plurality of memory blocks;

profiling memory block access during said first memory access process;

identifying memory blocks accessed most frequently during said first memory access process;

storing a list of said most frequently accessed memory blocks;

monitoring said computer system to identify when said first memory access process is initiated;

pre-loading said cache, at an initiation of said first memory access process, with said memory blocks identified in said list.

2. The method of claim 1 wherein said mapping step comprises mapping a first region of memory stored in a hard disk drive.

3. The method of claim 2 wherein one of said at least one type of memory access process comprises an executable program code loading process.

4. The method of claim 3 wherein said profiling step further comprises:

stopping profiling said first memory access process when said first memory access process remains idle for a predetermined time;

stopping profiling said first memory access process when a timeout period expires if said first memory access process does not remain idle for a predetermined time, wherein said timeout period is calculated based on said first memory access process.

5. The method of claim 3 wherein said monitoring step further comprises the steps of:

identifying a request to execute a file;

determining whether a name of said file is an executable file name;

if said file name is an executable file name, profiling memory block access during launching of said executable file;

if said file name is not an executable file name, monitoring memory block access to identify at least one type of memory access process.

6. The method of claim 3 wherein said monitoring step further comprises the steps of:

identifying a request to execute a file;

determining whether a do not inherit flag is set;

if said do not inherit flag is set, profiling memory block access during launching of said file;

if said do not inherit flag is not set, monitoring memory block access to identify at least one type of memory access process.

7. The method of claim 3 wherein one of said at least one type of memory access process comprises a program module loading process, wherein said program module loading process is initiated pursuant to a request from a main executable program.

8. The method of claim 2 wherein one of said at least one type of memory access process comprises a Dynamic Link Library loading process.

9. The method of claim 2 wherein one of said at least one type of memory access process comprises a data loading process.

10. The method of claim 2 wherein:

said profiling step further comprises profiling said first memory access process each time said first memory access process is performed;

said storing step further comprises storing said list of said most frequently accessed memory blocks from a most recent memory access process; and said pre-loading step further comprises pre-loading said cache, at an initiation of said first memory access process, with said memory blocks from said most recent memory access process.

11. The method of claim 2 further comprising the steps of:

storing a plurality of lists of said most frequently accessed memory blocks from a plurality of performances of said first memory access process;

performing statistical analysis on said plurality of lists to identify memory blocks that are most likely to be most frequently accessed next time said first memory access process is performed.

12. The method of claim 2 wherein each of said memory blocks comprise a plurality of memory pages.

13. An article of manufacture comprising:

a computer usable medium having computer readable program code embodied therein for loading a cache in a computer system, the computer readable program code in said article of manufacture comprising;

computer readable program code configured to cause a computer to monitor memory access to identify at least one type of memory access process;

computer readable program code configured to cause a computer to map a first region of memory, defined by a first memory access process of said at least one type of memory access process, into a plurality of memory blocks;

computer readable program code configured to cause a computer to profile memory block access during said first memory access process;

computer readable program code configured to cause a computer to identify memory blocks accessed most frequently during said first memory access process;

computer readable program code configured to cause a computer to store a list of said most frequently accessed memory blocks;

computer readable program code configured to cause a computer to monitor said computer system to identify when said first memory access process is initiated;

computer readable program code configured to cause a computer to pre-load said cache, at an initiation of said first memory access process, with said memory blocks identified in said list.

14. The article of manufacture of claim 13 wherein said computer readable program code configured to cause a computer to map a first region of memory further comprises:

computer readable program code configured to cause a computer to map a first region of memory stored in a hard disk drive.

15. The article of manufacture of claim 14 wherein said computer readable program code configured to cause a computer to monitor memory access further comprises:
 computer readable program code configured to cause a computer to identify memory access processes that comprise executable program code loading processes.

16. The article of manufacture of claim 15 wherein said computer readable program code configured to cause a computer to profile memory block access further comprises:
 computer readable program code configured to cause a computer to stop profiling said first memory access process when said first memory access process remains idle for a predetermined time;
 computer readable program code configured to cause a computer to stop profiling said first memory access process when a timeout period expires if said first memory access process does not remain idle for a predetermined time, wherein said timeout period is calculated based on said first memory access process.

17. The article of manufacture of claim 15 wherein said computer readable program code configured to cause a computer to monitor memory access further comprises:
 computer readable program code configured to cause a computer to identify a request to execute a file;
 computer readable program code configured to cause a computer to determine whether a name of said file is an executable file name;
 computer readable program code configured to cause a computer, if said file name is an executable file name, to profile memory block access during launching of said executable file;
 computer readable program code configured to cause a computer, if said file name is not an executable file name, to monitor memory block access to identify at least one type of memory access process.

18. The article of manufacture of claim 15 wherein said computer readable program code configured to cause a computer to monitor memory access further comprises:
 computer readable program code configured to cause a computer to identify a request to execute a file;
 computer readable program code configured to cause a computer to determine whether a do not inherit flag is set;
 computer readable program code configured to cause a computer, if said do not inherit flag is set, to profile memory block access during launching of said file;
 computer readable program code configured to cause a computer, if said do not inherit flag is not set, to monitor memory block access to identify at least one type of memory access process.

19. The article of manufacture of claim 15 wherein said computer readable program code configured to cause a computer to monitor memory access further comprises:
 computer readable program code configured to cause a computer to identify a memory access process that comprises a program module loading process, wherein said program module loading process is initiated pursuant to a request from a main executable program.

20. The article of manufacture of claim 14 wherein said computer readable program code configured to cause a computer to monitor memory access further comprises:
 computer readable program code configured to cause a computer to identify memory access processes that comprise Dynamic Link Library loading processes.

21. The article of manufacture of claim 14 wherein said computer readable program code configured to cause a computer to monitor memory access further comprises:
 computer readable program code configured to cause a computer to identify memory access processes that comprise data loading processes.

22. The article of manufacture of claim 14 wherein:
 said computer readable program code configured to cause a computer to profile memory block access further comprises computer readable program code configured to cause a computer to profile said first memory access process each time said first memory access process is performed;
 said computer readable program code configured to cause a computer to store a list further comprises computer readable code configured to cause a computer to store said list of most frequently accessed memory blocks from a most recent memory access process; and
 said computer readable program code configured to cause a computer to pre-load said cache further comprises computer readable program code configured to cause a computer to pre-load said cache, at an initiation of said first memory access process, with said memory blocks identified in said list of said most frequently accessed memory blocks from said most recent memory access process.

23. The article of manufacture of claim 14 wherein said computer readable program code configured to cause a computer to store a list further comprises:
 computer readable program code configured to cause a computer to store a plurality of lists of said most frequently accessed memory blocks from a plurality of performances of said first memory access process;
 computer readable program code configured to cause a computer to perform statistical analysis on said plurality of lists to identify memory blocks that are most likely to be most frequently accessed a next time said first memory access process is performed.

24. The article of manufacture of claim 14 wherein said computer readable program code configured to cause a computer to map a first region of memory further comprises:
 computer readable program code configured to cause a computer to map a first region of memory, defined by a first memory access process of said at least one type of memory access process, into a plurality of memory blocks, wherein each of said memory blocks comprise a plurality of memory pages.

25. A method for loading a cache in a computer system comprising the steps of:
 monitoring memory access to identify at least one type of memory access process that comprises an executable program code loading process;
 mapping a first region of memory, defined by a first memory access process of said at least one type of memory access process, into a plurality of memory blocks;
 profiling memory block access during said first memory access process;
 identifying memory blocks accessed most frequently during said first memory access process;
 storing a list of said most frequently accessed memory blocks;
 monitoring said computer system to identify when said first memory access process is initiated;
 pre-loading said cache, at an initiation of said first memory access process, with said memory blocks identified in said list.

26. A method for loading a cache in a computer system comprising the steps of:

monitoring memory access to identify at least one type of memory access process that comprises an executable program code loading process;

mapping a first region of memory, defined by a first memory access process of said at least one type of memory access process, into a plurality of memory blocks;

profiling memory block access during said first memory access process;

identifying memory blocks accessed most frequently during said first memory access process;

storing a list of said most frequently accessed memory blocks;

monitoring said computer system to identify when said first memory access process is initiated;

pre-loading said cache, at an initiation of said first memory access process, with said memory blocks identified in said list;

stopping profiling said first memory access process when said first memory access process remains idle for a predetermined time;

stopping profiling said first memory access process when a timeout period expires if said first memory access process does not remain idle for a predetermined time, wherein said timeout period is calculated based on said first memory access process.

27. A method for loading a cache in a computer system comprising the steps of:

monitoring memory access to identify at least one type of memory access process that comprises an executable program code loading process;

mapping a first region of memory, defined by a first memory access process of said at least one type of memory access process, into a plurality of memory blocks;

profiling memory block access during said first memory access process;

identifying memory blocks accessed most frequently during said first memory access process;

storing a list of said most frequently accessed memory blocks;

monitoring said computer system to identify when said first memory access process is initiated;

pre-loading said cache, at an initiation of said first memory access process, with said memory blocks identified in said list;

identifying a request to execute a file;

determining whether a do not inherit flag is set;

if said do not inherit flag is set, profiling memory block access during launching of said file;

if said do not inherit flag is not set, monitoring memory block access to identify at least one type of memory access process.

28. An article of manufacture comprising:

a computer usable medium having computer readable program code embodied therein for loading a cache in a computer system, the computer readable program code in said article of manufacture comprising:

computer readable program code configured to cause a computer to monitor memory access to identify at least one type of memory access processes that comprise executable program code loading processes;

computer readable program code configured to cause a computer to map a first region of memory, defined by a first memory access process of said at least one type of memory access process, into a plurality of memory blocks;

computer readable program code configured to cause a computer to profile memory block access during said first memory access process;

computer readable program code configured to cause a computer to identify memory blocks accessed most frequently during said first memory access process;

computer readable program code configured to cause a computer to store a list of said most frequently accessed memory blocks;

computer readable program code configured to cause a computer to monitor said computer system to identify when said first memory access process is initiated;

computer readable program code configured to cause a computer to pre-load said cache, at an initiation of said first memory access process, with said memory blocks identified in said list;

computer readable program code configured to cause a computer to stop profiling said first memory access process when said first memory access process remains idle for a predetermined time;

computer readable program code configured to cause a computer to stop profiling said first memory access process when a timeout period expires if said first memory access process does not remain idle for a predetermined time, wherein said timeout period is calculated based on said first memory access process.

29. The article of manufacture of claim 28 wherein said computer readable program code configured to cause a computer to monitor memory access further comprises:

computer readable program code configured to cause a computer to identify a request to execute a file;

computer readable program code configured to cause a computer to determine whether a do not inherit flag is set;

computer readable program code configured to cause a computer, if said do not inherit flag is set, to profile memory block access during launching of said file;

computer readable program code configured to cause a computer, if said do not inherit flag is not set, to monitor memory block access to identify at least one type of memory access process.

* * * * *